US010847118B2

(12) United States Patent
Baar et al.

(10) Patent No.: US 10,847,118 B2
(45) Date of Patent: Nov. 24, 2020

(54) ELECTRONIC DEVICES WITH TONE MAPPING ENGINES

(71) Applicant: Apple Inc., Cupertino, CA (US)

(72) Inventors: Teun R. Baar, San Francisco, CA (US); Marc Albrecht, San Francisco, CA (US); Tobias Jung, San Francisco, CA (US); Jiaying Wu, San Jose, CA (US); Nicolas P. Bonnier, Campbell, CA (US); Nathaniel C. Begeman, Saratoga, CA (US); Ian C. Hendry, San Jose, CA (US)

(73) Assignee: Apple Inc., Cupertino, CA (US)

( * ) Notice: Subject to any disclaimer, the term of this patent is extended or adjusted under 35 U.S.C. 154(b) by 24 days.

(21) Appl. No.: 15/907,078

(22) Filed: Feb. 27, 2018

(65) Prior Publication Data

US 2018/0330695 A1 Nov. 15, 2018

Related U.S. Application Data

(60) Provisional application No. 62/505,678, filed on May 12, 2017.

(51) Int. Cl.

| | |
|---|---|
| ***G09G 5/10*** | (2006.01) |
| ***G09G 5/02*** | (2006.01) |
| ***G06K 9/62*** | (2006.01) |

(52) U.S. Cl.

CPC ............. *G09G 5/10* (2013.01); *G06K 9/6202* (2013.01); *G09G 5/02* (2013.01);

(Continued)

(58) Field of Classification Search

CPC ..... G09G 2360/144; G09G 2320/0626; G09G 5/02; G09G 2320/0666; G09G 2320/066;

(Continued)

(56) References Cited

U.S. PATENT DOCUMENTS

| | | | |
|---|---|---|---|
| 8,107,756 | B2 | 1/2012 | Chen et al. |
| 9,514,508 | B2 | 12/2016 | Ballestad et al. |

(Continued)

OTHER PUBLICATIONS

Mantiuk et al., "Display Adaptive Tone Mapping" Sharp Laboratories of America, Proceedings of ACM SIGGRAPH, ACM Transactions on Graphics (TOG) TOG Homepage, vol. 27, Issue 3, Article No. 68, Aug. 2008. (https://www.cl.cam.ac.uk/~rkm38/pdfs/mantiuk08datm.pdf>.

(Continued)

*Primary Examiner* — Koosha Sharifi-Tafreshi

(74) *Attorney, Agent, or Firm* — Treyz Law Group, P.C.; G. Victor Treyz; Kendall W. Abbasi

(57) ABSTRACT

An electronic device may be provided with a display. A content generator may generate frames of image data to be displayed on the display. Control circuitry in the electronic device may be used in implementing a tone mapping engine. The tone mapping engine may display content from the content generator on the display in accordance with a content-luminance-to-display luminance mapping. The content-luminance-to-display-luminance mapping is characterized by tone mapping parameters such as a black level, a reference white level, and a specular white level. The tone mapping engine may adjust the tone mapping parameters based on ambient light levels, user brightness settings, content statistics, and display characteristics.

20 Claims, 11 Drawing Sheets

(52) U.S. Cl.
CPC ............... *G09G 2320/0238* (2013.01); *G09G 2320/0276* (2013.01); *G09G 2320/046* (2013.01); *G09G 2320/066* (2013.01); *G09G 2360/144* (2013.01); *G09G 2360/16* (2013.01)

(58) Field of Classification Search
CPC .... G09G 5/10; G09G 3/2003; G09G 2340/06; G09G 2320/0673
See application file for complete search history.

(56) References Cited

U.S. PATENT DOCUMENTS

| | | | | |
|---|---|---|---|---|
| 2010/0171751 | A1* | 7/2010 | Kim | G09G 3/3208 345/589 |
| 2014/0375704 | A1* | 12/2014 | Bi | G09G 3/3275 345/694 |
| 2015/0054807 | A1 | 2/2015 | Ballestad | |
| 2015/0243200 | A1* | 8/2015 | Pan | H04N 19/98 345/590 |
| 2017/0034520 | A1 | 2/2017 | Rosewarne | |
| 2018/0204542 | A1* | 7/2018 | Saito | G09G 5/14 |

OTHER PUBLICATIONS

Rempel et al., "Video Viewing Preferences for HDR Displays Under Varying Ambient Illumination" APGV '09 Proceedings of the 6th Symposium on Applied Perception in Graphics and Visualization, pp. 45-52, 2009. (http://vccimaging.org/Publications/Rempel2009VVW/Rempel2009VVW.pdf>.

* cited by examiner

ELECTRONIC DEVICES WITH TONE MAPPING ENGINES

This application claims the benefit of provisional patent application No. 62/505,678, filed May 12, 2017, which is hereby incorporated by reference herein in its entirety.

BACKGROUND

This relates generally to electronic devices, and, more particularly, to electronic devices with displays.

Electronic devices often include displays. If care is not taken, displays may be damaged by displaying bright content for prolonged periods of time, displays may be operated with brightness levels that consume excessive power, user preferences may not be taken into account when adjusting display brightness, and displayed content may exhibit visible artifacts. Addressing these concerns while displaying content with a pleasing appearance is challenging.

SUMMARY

An electronic device may be provided with a display. A content generator on the electronic device may provide content to be displayed on the display.

Control circuitry in the electronic device may be used in implementing a tone mapping engine. The tone mapping engine may select a content-luminance-to-display luminance mapping to be used in displaying content on the display from the content generator. The content-luminance-to-display-luminance mapping may be characterized by tone mapping parameters such as a black level, a reference white level, and a specular white level.

During operation, the tone mapping engine may adjust the tone mapping parameters based on ambient light levels, user brightness settings, content statistics, and display characteristics.

DETAILED DESCRIPTION

Figure 1:
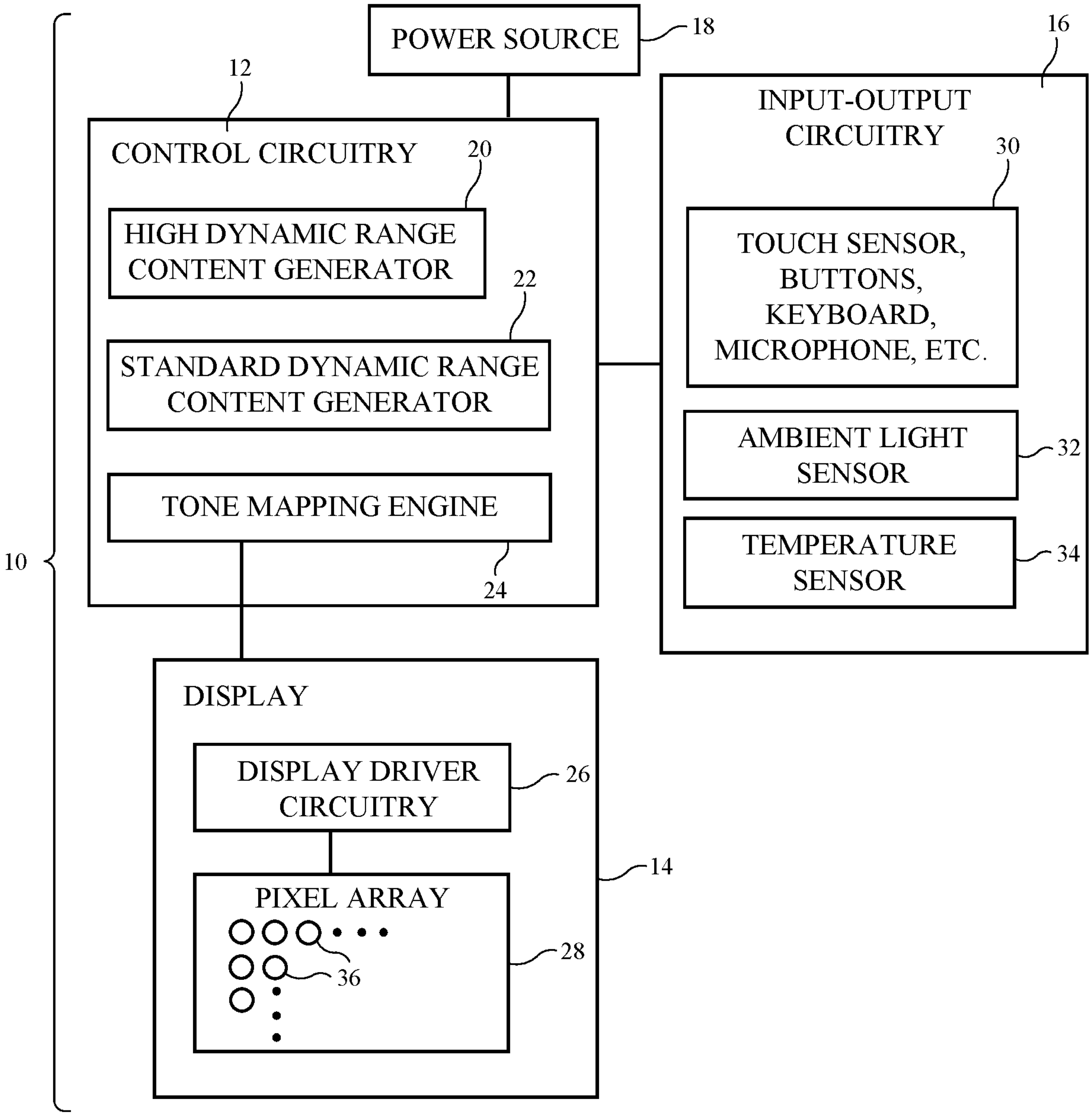
FIG. 1 is a schematic diagram of an illustrative electronic device having a display in accordance with an embodiment.

An illustrative electronic device of the type that may be provided with a display is shown in FIG. 1. As shown in FIG. 1, electronic device 10 may have control circuitry 12. Control circuitry 12 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application-specific integrated circuits, graphics processing units, display driver circuitry such as timing controller integrated circuits and other display driver integrated circuits, and other control circuitry.

Control circuitry 12 is configured to execute instructions for implementing desired control and communications features in device 10. For example, control circuitry 12 may be used in determining pixel luminance levels that are to be used in displaying content for a user. Pixel luminance levels may be based, for example, on ambient light conditions, user-adjusted display brightness settings, statistical information associated with content that is being displayed, and display characteristics. Control circuitry 12 may be configured to perform these operations using hardware (e.g., dedicated hardware such as integrated circuits and thin-film circuits) and/or software (e.g., code that runs on control circuitry 12). Software code for performing control and communications operations for device 10 may be stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 12 during operation of device 10.

Input-output circuitry 16 in device 10 may be used to allow data to be supplied to device 10 from a user or external equipment, may be used to gather environmental data, and may be used to supply data to external equipment and output for a user. Input-output circuitry 16 may include input-output devices 30 such as buttons, joysticks, scrolling wheels, touch pads, key pads, keyboards, microphones, speakers, tone generators, vibrators, cameras, sensors, light-emitting diodes and other status indicators, touch sensitive displays (e.g., touch sensors overlapping pixel arrays in displays), data ports, etc. As shown in FIG. 1, input-output circuitry 16 may include a color ambient light sensor or other ambient light sensor 32 for gathering ambient light measurements (e.g., ambient light levels such as ambient light luminance measurements and/or ambient light color measurements such as color temperature measurements and/or color coordinate measurements). Input-output circuitry 16 may also include temperature sensor circuitry such as one or more temperature sensors. Temperature sensors such as temperature sensor 34 may be used to gather real time information on the operating temperature of device 10 and display(s) associated with device 10.

Power may be supplied to control circuitry 12 and other resources in device 10 using one or more power sources such as power source 18. Power source 18 may be an alternating-current (AC) source such as a wall outlet (mains supply) and/or a direct-current (DC) source such as a battery. During operation, control circuitry 12 can detect whether power is being received from an AC or DC source and can monitor the charge state of the battery.

Device 10 may include one or more internal and/or one or more external displays such as illustrative display 14. Display 14 may be mounted in a common housing with device 10 (e.g., when device 10 is a mobile device such as a cellular telephone, wristwatch device, tablet computer, or laptop computer or when device 10 is an all-in-one device such as a television or desktop computer). In other configurations, display 14 may be coupled to device 10 wirelessly or with a cable (e.g., when device 10 is a desktop computer or a set-top box).

In general, device 10 may be any suitable type of device. Device 10 may, for example, be a computing device laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. Device 10 (e.g., a portable device) may be exposed to a variety of environmental conditions. For example, ambient light levels and therefore display glare may vary as a portable device is moved between indoors and outdoors environments (as an example).

Electronic device may have a housing. The housing, which may sometimes be referred to as an enclosure or case, may be formed of plastic, glass, ceramics, fiber composites, metal (e.g., stainless steel, aluminum, etc.), other suitable materials, or a combination of any two or more of these materials. The housing may be formed using a unibody configuration in which some or all of the housing is machined or molded as a single structure or may be formed using multiple structures (e.g., an internal frame structure, one or more structures that form exterior housing surfaces, etc.). In laptop computers and other foldable devices, a first portion of the housing may rotate relative to a second portion of the housing (e.g., a display housing in a laptop computer may rotated about a hinge axis relative to a base housing in the laptop computer).

Display 14 may be mounted in the housing. Display 14 may have a rectangular outline and be surrounded by four peripheral edges, may have a shape that is circular or oval, or may have other suitable outlines. Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may have an array 28 of pixels 36 for displaying images for a user (e.g., video, graphics, text, etc.). Display driver circuitry 26 (e.g., thin-film transistor circuitry on display 14 and/or one or more timing-controller integrated circuits and/or other display driver integrated circuits) may be used to display images on pixel array 28. Pixel array 28 may include, for example, hundreds or thousands of rows and hundreds or thousands of columns of pixels 36. To display color images, each pixel 36 may include subpixels of different colors. For example, each pixel 36 may include, red, green, and blue subpixels or subpixels of different colors. By varying the relative intensity of light emitted by each subpixel in a pixel, pixel output color can be adjusted. The color cast (white point) of each pixel can be adjusted by modifying the gain associated with each subpixel.

The pixel array of display 14 may be formed from liquid crystal display (LCD) components, an array of electrophoretic display pixels, an array of plasma display pixels, an array of organic light-emitting diode pixels or other light-emitting diodes, an array of electrowetting display pixels, or pixels based on other display technologies. Display 14 may be backlit with an array of locally dimmable light-emitting diodes or other suitable backlight structures. Display 14 may display images with a standard dynamic range (e.g., images that exhibit a contrast ratio of about 1,000:1 between their brightest and darkest pixel luminance values) and/or may display images with a high dynamic range (e.g., images that exhibit a contrast ratio of about 10,000:1 or more between their brightest and darkest luminance values).

During operation, content generators in device 10 (e.g., operating system functions and/or applications running on control circuitry 12) may generate content for display on the pixel array of display 14. As an example, electronic device 10 may include one or more standard dynamic range (SDR) content generators (e.g., games or other code rendering content, content players, etc.) and/or more high dynamic range (HDR) content generators (e.g., games or other code rendering content, content players, etc.). A luminance value mapping engine such as tone mapping engine 24 may be used to provide content generators with tone mapping parameters (sometimes referred to as luminance value mapping parameters) indicating how the content generators should map content luminance values to display luminance values and/or may be used to directly perform content-luminance-to-display-luminance mapping operations on content luminance values from the content generators. For example, tone mapping engine 24 may supply content generators with tone mapping parameters such as a black level, reference white level, and specular white level to use in producing display luminance values for use in displaying images with pixels 36. Tone mapping engine 24 may be implemented using code running on control circuitry 12 of FIG. 1, control circuitry for device 10 such as display driver circuitry 26, and/or other control circuitry and/or may use hardwired features of the control circuitry in device 10. The tone mapping parameters may be expressed in any suitable format. For example, the black level, reference white level, and/or the specular white level may respectively be a black level in cd/m$^2$, a reference white level in cd/m$^2$, and a specular white level in cd/m$^2$.

Standard dynamic range content is often encoded in grey levels (e.g., 0-256 bits), where 0 corresponds to dark black and 256 corresponds to bright white. High dynamic range content is often encoded in luminance levels for each pixel (generally to be displayed for standard viewing conditions such as dim viewing conditions). Device 10 may experience changes in ambient lighting conditions, user brightness settings may be adjusted up and down by a user, the content being displayed on display 14 may exhibit changes such as changes in average pixel luminance, burn-in risk, image quality, and other conditions related to the presentation of content on display 10 may change over time. Device 10 may use tone mapping engine 24 to ensure that content is rendered appropriately for displaying on display 14 in view of these potentially changing conditions and other criteria such as the characteristics of display 14.

Figure 2:
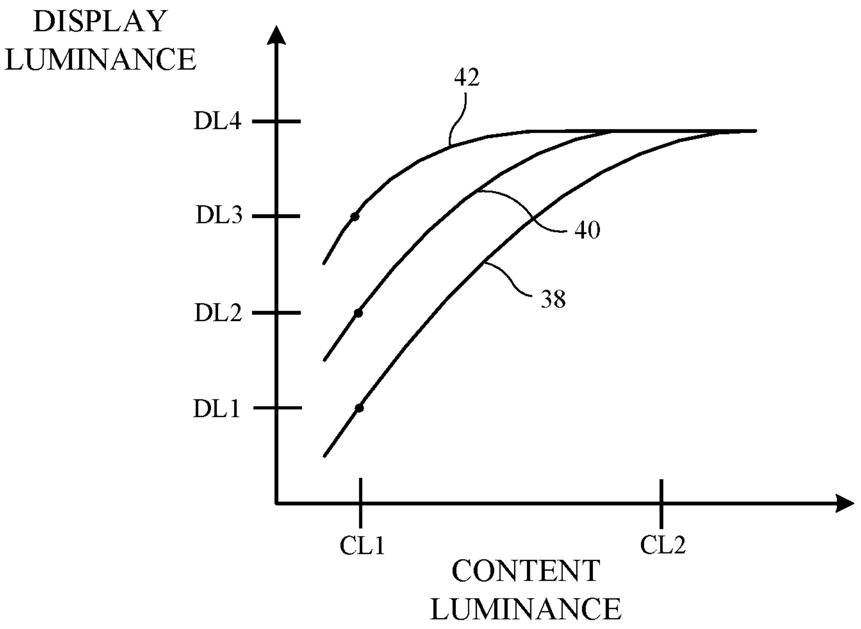
FIG. 2 is a graph showing how content luminance may be mapped to display luminance over a variety of user brightness settings in accordance with an embodiment.

FIG. 2 is a graph showing how content luminance values can be mapped to display luminance values in device 10 in accordance with three illustrative content-luminance-to-display-luminance mapping curves. The content luminance and display luminance axes of the graph of FIG. 2 (and the other luminance mapping graphs) have logarithmic scales. In the FIG. 2 example, a user is adjusting a display brightness setting for display 14 between three different levels (dim, moderate, and bright display brightness settings, respectively). A user may supply device 10 with a desired brightness setting (user-selected brightness level) by adjusting a touch screen display slider (e.g., a slider displayed on display 14) or using a button or other input-output device in circuitry 16. When a dim brightness setting level is selected, display 14 displays content in accordance with curve 38. When a moderate brightness setting level is selected, display 14 displays content in accordance with curve 40. The output of display 14 follows curve 42 in response to selection of a high brightness setting.

In each of these curves, low content luminance values are associated with black and low grey levels and high content luminance values are associated with white and high gray levels. At a given black content luminance level (e.g., BC1), curve 38 is associated with a display pixel luminance value of DL1 visible to the user for a content luminance value of CL1, curve 40 is associated with a display pixel luminance value of DL2 for content luminance CL1, and curve 42 is associated with a display pixel luminance value DL3 for content luminance CL1. The luminance level DL2 is brighter than luminance level DL1, because curve 40 is associated with a brighter set of output luminances from pixels 36 than curve 38. Similarly, luminance level DL3 is brighter than luminance level DL2 because curve 42 is associated with a brighter set of output luminances from pixels 36 than curve 40. White image pixels (e.g., pixels at content luminance level CL2) are all associated with the same display luminance level DL4 (e.g., the brightest output available from pixels 36 in display 14), so the mappings of curves 38, 40, and 42 will all produce a display luminance of DL4 for a content luminance of CL2.

Figure 3:
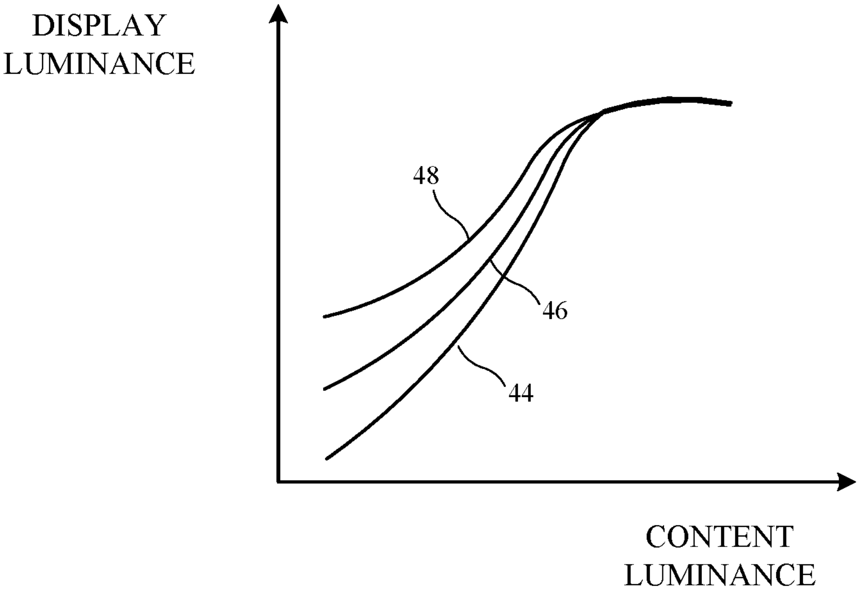
FIG. 3 is a graph showing how content luminance may be mapped to display luminance over a variety of ambient light conditions in accordance with an embodiment.

FIG. 3 is a graph showing how content luminance values can be mapped to display luminance values by device 10 in three different illustrative ambient light conditions. In the example of FIG. 3, curve 44 is associated with dim ambient light conditions (e.g., conditions corresponding to a dark indoors environment), curve 46 is associated with moderate ambient lighting conditions (e.g., a bright office or dim outdoors environment), and curve 48 is associated with bright ambient lighting conditions (e.g., a bright outdoors environment). Although similar to the curves of FIG. 2, the curves of FIG. 3 may be optimized for changes in ambient lighting conditions rather than user brightness settings. For example, whereas in dim lighting conditions curves 44 and 38 may be similar, ambient light glare may be present on display 14 under bright lighting conditions that tends to obscure black portions of the images on display 14. As a result, the curves of FIG. 3 (see, e.g., bright ambient light curve 48) may have somewhat elevated display luminance values at low content luminances to help overcome the ambient light glare, whereas this elevation in the output luminance for black content may not be present in scenarios in which a user has increased display brightness by selecting a curve such as curve 42 of FIG. 2.

In general, display characterization may involve user studies, modeling, and laboratory testing that helps establish desired tone mapping schemes for device 10 under a variety of operating conditions (e.g., user brightness settings, ambient light levels, and other operating conditions). These tone mapping schemes can then be implemented by tone mapping engine 24.

With one illustrative configuration, tone mapping engine 24 can select a desired tone mapping curve based on operating conditions such as display brightness settings (e.g., user defined brightness settings and brightness levels set by device 10 to accommodate a normal power operating mode and a low-power operating mode), ambient conditions (ambient light level and ambient light color), content statistics (e.g., information on average pixel luminance and burn-in risk or other information on operating conditions having a potential impact on display lifetime, quality information, dynamic range information etc.), and display characteristics (e.g., display limitations such as maximum achievable pixel luminance, power constraints (e.g., due to thermal limitations and/or other considerations), whether device 10 is operating on DC power (power from the battery in source 18 of device 10) or AC power, etc.

During operation, tone mapping engine 24 may obtain information on these operating conditions and may take suitable action to ensure that display 14 displays images satisfactorily. Tone mapping engine 24 may, as an example, remap content so that luminance values that are too high when output from a content generator are reduced by engine 24 before these values are used by display 14. In some situations, luminance values associated with specular highlights may, as an example, be clipped using a soft clipping arrangement to ensure that pixels 36 are not driven too strongly for display 14. Tone mapping engine 24 may also provide content generators such as content generators 20 and/or 22 with tone mapping parameters that inform the content generators of a desired content-luminance-to-display-luminance mapping curve to be used in displaying images on display 14.

Figure 4:
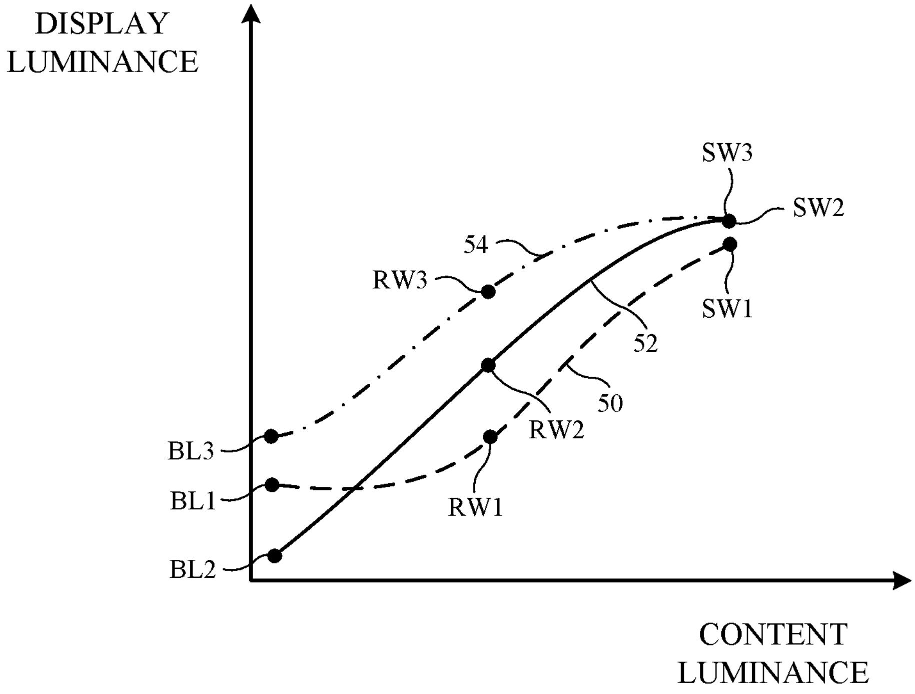
FIG. 4 is a graph showing how content-luminance-to-display-luminance relationships may be characterized by a black level, reference white level, and specular white level in accordance with an embodiment.

The use of tone mapping parameters to define content-luminance-to-display-luminance mapping curves is shown in FIG. 4. In the example of FIG. 4, there are three illustrative mapping curves: curve 50, 52, and 54. Each of these curves may be identified using a set of tone mapping parameters such as a black (BL), reference white level (RW), and specular white level (SW). During operation, engine 24 may supply content generators such as content generators 20 and/or 22 with suitable values of these tone mapping parameters, thereby informing content generators 20 and/or 22 whether to use curve 50, curve 52, or curve 54. If, for example, engine 24 supplies a content generator with tone mapping parameters BL1, RW1, and SW1, the content generator can generate display luminance values from content luminance values following curve 50. If, engine 24 supplies the content generator with tone mapping parameters BL2, RW2, and SW2, the content generator can generate display luminance values from content luminance values following curve 52. The content generator can generate display luminance values from content luminance values following curve 54 in response to tone mapping parameters BL3, RW3, and SW3 from engine 24. In this way, a set of tone mapping parameters (e.g., three or more tone-mapping parameters, 3-10 tone-mapping parameters, fewer than 5 tone-mapping parameters, etc.) can be used by engine 24 to specify a desired tone mapping relationship for the content generator to follow depending on current operating conditions.

Figure 5:
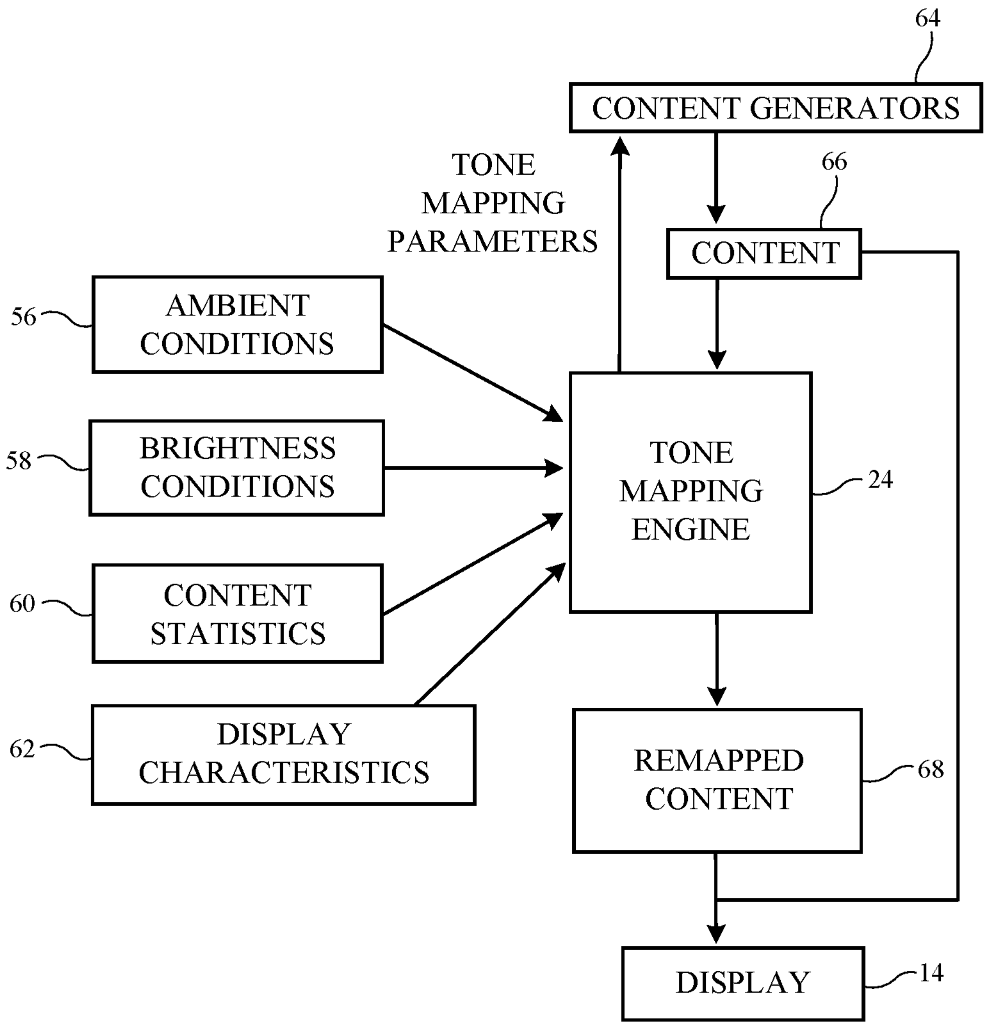
FIG. 5 is a diagram showing how a tone mapping engine can be used in implementing content-luminance-to-display-luminance mappings in accordance with an embodiment.

FIG. 5 is a diagram showing how tone mapping engine 24 may receive input such as ambient conditions 56, brightness settings information 58, content statistics 60, and display characteristics 62.

Ambient conditions 56 may include a current ambient light level measured with ambient light sensor 32 and/or a current ambient color (e.g., a color temperature, set of color coordinates, etc.) measured with ambient light sensor 32. As environmental brightness increases, display brightness can be increased to compensate for screen glare. As environmental color shifts (e.g., as a user moves device 10 from a warm indoor lighting environment to a cold outdoor lighting environment), the white point (color cast) of display 14 can be cooled accordingly to avoid undesired color cast effects in displayed images.

Brightness settings information 58 may include a user-selected brightness level and may include a brightness level determined by control circuitry 12 based on power consumption considerations. User brightness settings may be adjusted based on user input from a user on a touch screen, based on user keyboard input, and/or based on other user input. Power-consumption-based brightness level adjustments may be made by control circuitry 12 to help extend battery life. For example, control circuitry 12 may lower the brightness level for display 14 when device 10 enters a low power mode due to thermal conditions such as in response to detection that a temperature level measured with sensor 34 has exceeded a predetermined level, due to detection of a low battery level measured with control circuitry 12, based on detection that a user has placed device 10 in a low power mode to extend battery life, etc. In low power mode, control circuitry 12 may lower the current display brightness setting, may impose a cap on the brightness level, and/or may reduce the luminance of specular highlights or may make other adjustments that help reduce the power consumption of display.

Content statistics 60 may be gathered by analyzing frames of image data produced by content generator(s) 64 that are being displayed on display 14. Control circuitry 14 (e.g., a microprocessor, display driver integrated circuits, graphics processing unit circuitry, and/or other control circuitry in device 10) may, for example, maintain running averages of image luminance values (e.g., a running average pixel luminance value for images being displayed on display 14 over multiple image frames) and/or may maintain historical luminance information in a more granular fashion (e.g., on blocks of one or more pixels within pixel array 28) to quantify burn-in risk for each of these blocks. Other content statistics such as information on content quality such as bit depth, dynamic range of image input data (e.g., minimum, mean, and maximum value), compression type and amount, data rate, noise level, metadata-specified quality factors, and other content quality metrics can also be gathered and provided to tone mapping engine 24.

Display characteristics 62 may also be used by tone mapping engine 24. Display characteristics 62 may include information on physical display limitations for display 14. For example, display characteristics 62 may include information on the characteristics of pixel array 28 and display 14 (e.g., maximum achievable specular white level, display resolution, contrast ratio, bit depth, etc.). These display characteristics may be stored in control circuitry 12 during manufacturing (e.g., when display 14 is built into device 10) and/or may be obtained from display 14 when display 14 is coupled to device 10 (e.g., when display 14 is a stand-alone display). A user may also supply control circuitry 12 with display characteristics information (e.g., by entering this information using a keyboard or other input-output device). In some configurations, display characteristics may be set by default and/or retrieved from a database of display characteristics maintained in device 10 (e.g., a database of stand-alone display models).

During operation, content generators 64 may produce content to be displayed on display 14. Content generators 64 may, for example, render game images in a video game, may retrieve stored movie data and provide corresponding video frames to be displayed on display 14, may produce still image frames associated with an operating system function or application program, and/or may produce other content for displaying on display 14. The content from content generators 64 may include standard dynamic range content and/or high dynamic range content.

Tone mapping engine 24 may use information on ambient conditions 56, brightness settings information 58, content statistics 60, and/or display characteristics 62 to determine how original content values should be mapped to display content values (e.g., to determine how to map content luminance values to display luminance values in accordance with mapping curves of the type described in connection with FIG. 4). To ensure that content is displayed appropriately on display 14, tone mapping engine 24 can provide content generators 64 with tone mapping parameters to use in performing luminance mapping operations and/or can implement luminance mapping for content generators 64.

In some configurations, content generators 64 may be capable of adjusting content luminance values internally. In these situations, tone mapping engine 24 can supply content generators 64 with tone mapping parameters such as a black level, reference white level, and specular white level. The tone mapping parameters inform content generators 64 of an appropriate mapping curve to use in supplying content 66 to display 14.

In other configurations, content generators 64 may not be capable of adjusting content luminance values internally or it may otherwise be desirable to implement tone mapping separately from the tone mapping functions of content generators 64. In these circumstances, content 66 from content generator 64 may be provided to tone-mapping engine 24. Tone mapping engine 24 may then apply a desired content-luminance-to-display luminance mapping (e.g., a mapping defined by the tone mapping parameters BL, RW, and SW) to ensure that the luminance of content 66 is adjusted appropriately (e.g., so that content 66 is remapped in accordance with a desired content-luminance-to-display luminance mapping to produce corresponding remapped content 68 for displaying on display 14). In mapping the luminance values of content 66 to the new (remapped) luminance values of content 68, the content-luminance-to-display luminance mapping that is used by engine 24 may follow pre-defined parameters (e.g., default) tone mapping parameters or may use the same tone mapping parameters that engine 24 would provide to a content generator that is capable of adjusting content luminance values by applying the desired mapping internally.

Figure 6:
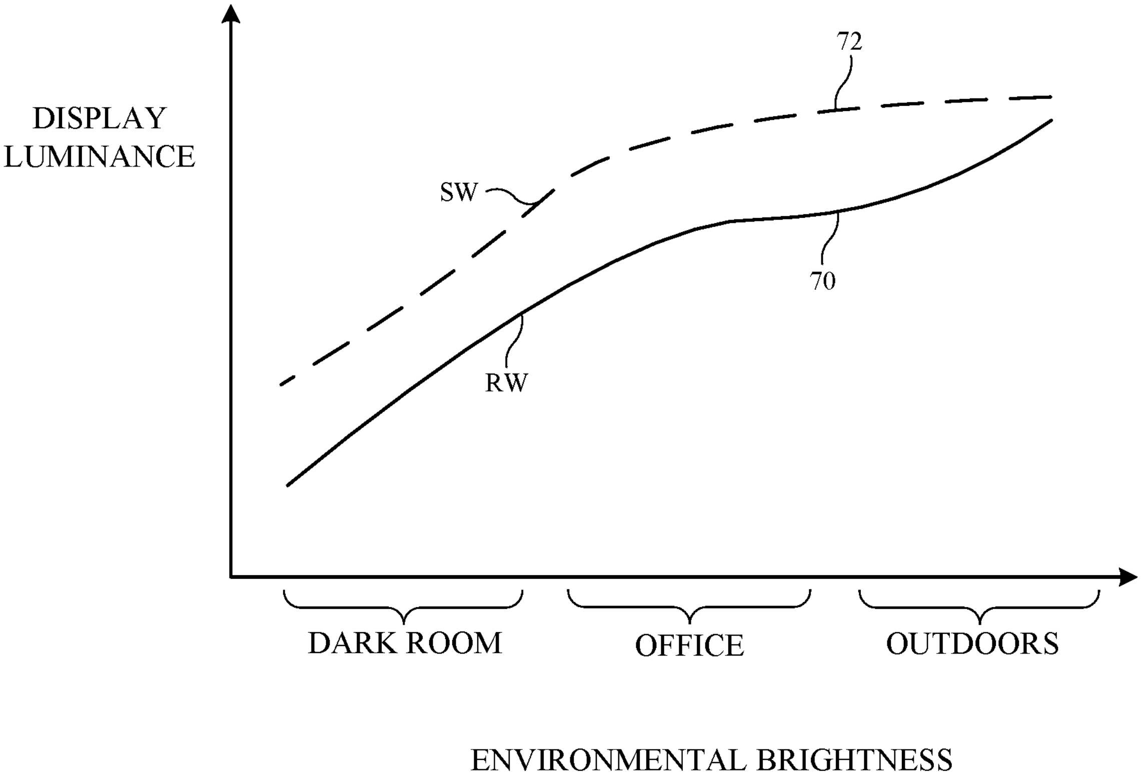
FIG. 6 is a graph showing how tone mapping parameters may be adjusted as a function of ambient light level in accordance with an embodiment.

FIG. 6 is a graph showing how tone mapping parameters such as specular white level SW and reference white level RW may be adjusted dynamically by engine 24 based on environmental brightness (e.g., based on measured ambient light levels). Specular white level SW and reference white level RW may, for example, follow respective curves 72 and 70 as the measured ambient light level rises from dark levels associated with a dark room to moderate levels associated with a well-lit office environment and rises further to elevated levels associated with a bright outdoors environment. When ambient lighting conditions are dim, RW and SW are low to conserve power or improve a user's experience. When ambient lighting conditions are moderately bright, RW and SW are increased to help overcome screen glare and allow images on display 14 to be viewed by the user. At very bright outdoors light levels, RW and SW may continue to be increased, but the difference between SW and RW may be reduced to accommodate the physical limits of display 14 (e.g., the maximum attainable luminance level of pixels 36). A look-up table (e.g., a look-up table in which the entry for each row includes an ambient light sensor value and a corresponding set of tone mapping parameters BL, RW, and SW) or other mapping information representing the ambient-light-sensor-data-to-tone-mapping-parameter curves of FIG. 6 (e.g., polynomials that have been fit to the curves of FIG. 6) may be used by control circuitry 12 in determining appropriate tone mapping parameters to use at each measured ambient light level.

The new black level after a measured ambient light level change may, for example, be based on the current black level, a current low gray level, display contrast ratio, and the measured ambient light level or may be based on the current black level and the measured ambient light level. The black level may be increased with increases in ambient brightness to increase visibility of dark areas of an image while content is being subjected to display glare. The new reference white level may increase with increase in ambient light level as shown by curve 70, so that the visibility of content is increased when in brighter viewing conditions. The specular white level may also increase with increases in ambient light level as shown by curve 72 and may be limited by the maximum luminance level of display 14. A time constant (transition period) may be associated with changes in these settings so that changes do not appear too rapidly on display 14 as a function of changes in ambient light level.

Ambient light color measurements may be gathered using ambient light sensor 32. Information on ambient light color such as color measurements from ambient light sensor 32 may be used by control circuitry 12 in adjusting the color cast (white point) for images displayed on display 14. In warm ambient lighting environments, control circuitry 12 can warm the color of images displayed on display 14 (e.g., the white point for display 14 can be warmed) and in cold ambient lighting environments, control circuitry 12 can cool the color of image displayed on display 14 (e.g., the white point for display 14 can be cooled). Image color can be adjusted by engine 24 (e.g., engine 24 can supply content generators 64 with color adjustments such as a desired white point setting to be applied to the content produced by content generators 64) and/or a white point setting can be applied using other code running on circuitry 12 (as an example).

Figure 7:
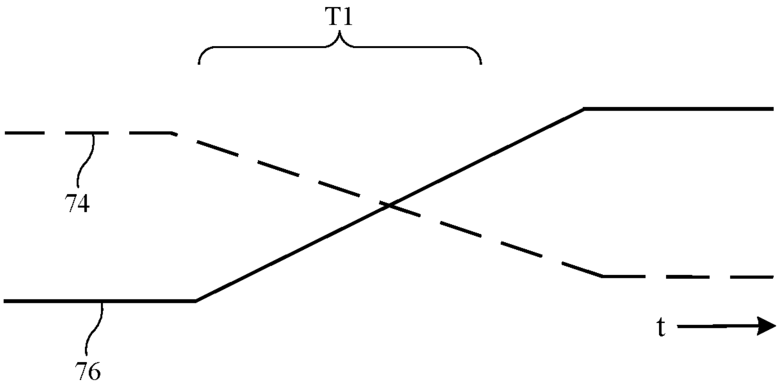
FIG. 7 is a graph showing how an operation such as a color adjustment operation can be reduced in strength when display headroom is increased in response to a headroom request in accordance with an embodiment.
Figure 8:
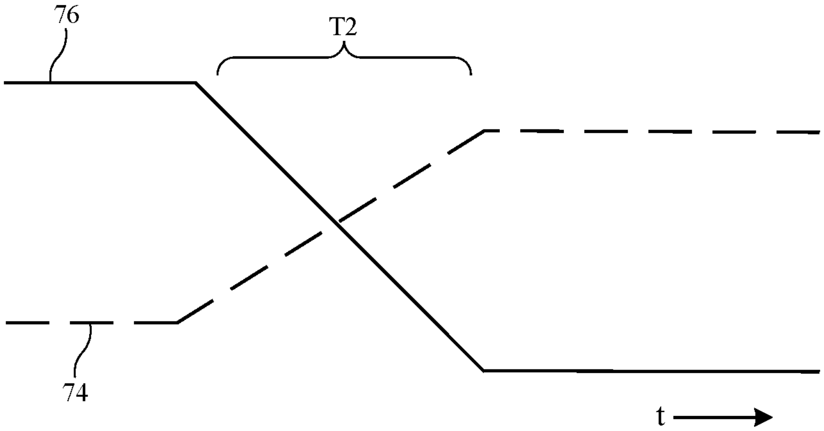
FIG. 8 is a graph showing how an operation such as the color adjustment operation can be increased in strength when the display headroom request expires and headroom is reduced in accordance with an embodiment.

When displaying high dynamic range content on display 14, the headroom of the content (i.e., the range between the specular white level and the reference white level of the content) may affect the amount of color correction that is visually pleasing to the user. To avoid undesired visual artifacts in images displayed on display 14 and thereby make content on display 14 more visually appealing, the strength of the color corrections that are applied in device 10 can be reduced as a function of increasing headroom. FIG. 7 shows how headroom color compensation strength (curve 74) can be decreased as headroom (curve 76) increases. Changes between low and high headroom and between high and low color compensation strength may be made gradually (e.g., over time period T1 in FIG. 7) to avoid undesired abrupt visual changes for the user. The value of T1 may be, for example, 1-10 s, less than 5 s, less than 1 s, at least 5 s, at least 10 s, or other suitable value. When headroom decreases over time period T2 of FIG. 8 (e.g., a time period of 1-10 s, less than 5 s, less than 1 s, at least 5 s, at least 10 s, or other suitable time period) as shown by curve 76 of FIG. 8, color compensation strength (curve 74) can be correspondingly increased, as shown by curve 74 of FIG. 8.

During operation, control circuitry 12 may monitor input-output circuitry 16 such as touch sensors, buttons, keyboard keys, microphones, and other input-output devices 30 for user input. In response to adjustment of a selectable touch screen slider button or key press input, control circuitry 12 may change a user-defined brightness setting for display 14. User display adjustments may, as an example, be used to increase display brightness when a user desires to make display 14 more visible under current viewing conditions. The display brightness adjustments may, for example, be used by engine 24 to increase the current value of reference white (RW). Configurations in which display brightness adjustments are also used in adjusting BL and SW values may also be used.

Figure 9:
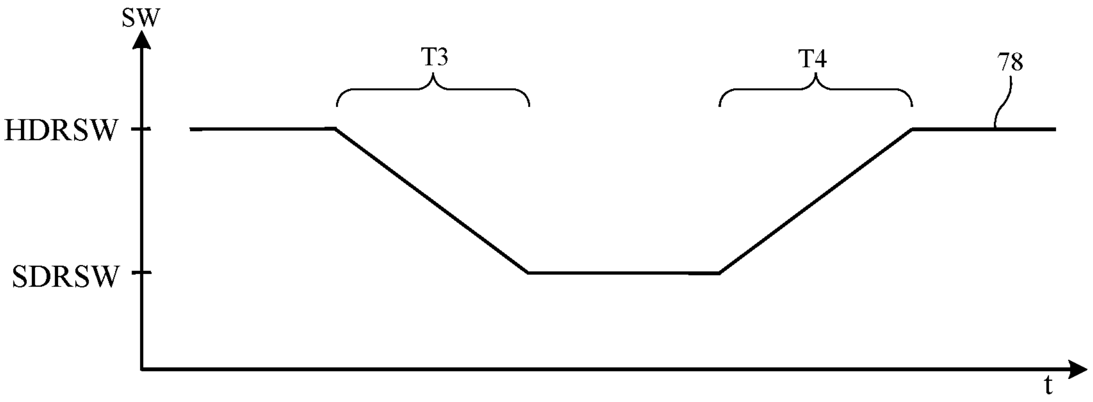
FIG. 9 is a graph showing how a tone mapping parameter such as a specular white level may be adjusted over a period of time in response to entering and exiting a low power mode of operation in accordance with an embodiment.

FIG. 9 is a graph showing how the value of specular white (SW) can be adjusted when a low power mode is turned on and off. During normal operation, when device 10 is not operating in a low power mode, content may be displayed on display 14 with a high SW value (e.g., HDRSW in the example of FIG. 9). When it is desired to conserve power, device 10 may be placed in a low power mode. In low power mode, the luminance of pixels associated with the whitest portions of the displayed content may be decreased. In particular, the value of SW may be lowered over a transition time period T3 (e.g., 0.1 to 20 s, more than 1 s, less than 10 s, etc.) to a lower value such as SDRSW. By reducing headroom and displaying less content with high-luminance values such as HDRSW, power consumption may be reduced. When it is no longer desired to operate in low power mode, the value of SW may be returned to the normal operating mode (e.g., over a transition time period T4 of 0.1 to 15 s, more than 1 s, less than 10 s, etc.). The values of RW and/or BL may remain constant when transitioning between normal power mode and low power mode or, if desired, the values of RW and/or BL may be reduced during low power mode. Control circuitry 12 may transition display 14 between low power mode and normal operating mode based on user input, thermal considerations, battery charge level, and/or other information. A user may, for example, place display 14 in low power mode when the user desires to extend battery life. Control circuitry 12 may also place display 14 in low power mode when the battery of device 10 becomes depleted or when the measured temperature of display 14 exceeds a predetermined threshold.

Figure 10:
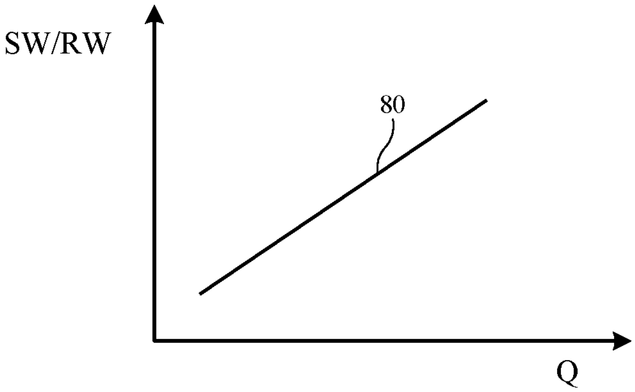
FIG. 10 is a graph showing how a tone mapping parameter such as a specular white level may be adjusted to accommodate content changes such as fluctuations in content quality in accordance with an embodiment.

Content quality may impact the tone mapping parameters that are used. For example, high dynamic range effects may be most visually appealing when content quality Q is high. As shown by curve 80 in FIG. 10, headroom (SW/RW) may therefore be increased as quality Q increases. Quality Q may be determined based on content quality factors such as content bit depth, metadata indicative of content quality, frame rate, compression type, compression amount, noise level (e.g., a noise metric determined by engine 24 from a frame-by-frame analysis of content being displayed), content data rate (bits/sec in a content stream), color gamut (whether normal or wider than normal), etc. Engine 24 may be used in determining Q dynamically and updating the headroom (e.g., the values of SW and RW) for content on display 14 accordingly. Headroom adjustments may be made over transition periods (e.g., periods such as periods T3 and T4 of FIG. 9).

Engine 24 may, if desired, adjust the headroom that is being used to display content on display 14 based on content statistics 60 such as information on dynamic range, minimum luminance, maximum luminance, average luminance, and/or information on the content (e.g., frame statistics produced by engine 24 in real time based on analysis of the frames of content being displayed). As an example, engine 24 may maintain a running average of the pixel luminance of the frames of content being displayed. The running average may, as an example, be determined using equation 1, where RefWhite(t) is the reference white level at time t, τ represents a scaling factor between 0 and 1, APL %/100 represents the average pixel luminance (in percent) divided by 100, and HS is equal to a suitable number of stops of headroom change (e.g., 3 stops or other suitable value).

$$\text{RefWhite}(t)=\text{RefWhite}(t-1)-\tau(\text{RefWhite}(t-1)-(HS-\text{APL }\%/100)) \quad (1)$$

Figure 11:
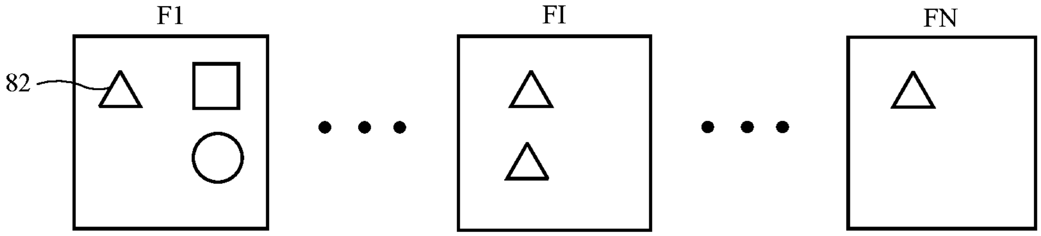
FIG. 11 is a diagram showing how image frames may be analyzed to produce content statistics such as average pixel luminance values and burn-in-risk values in accordance with an embodiment.

The value of RefWhite(t) in equation 1 may be used in determining how long bright content appears on display 14 regardless of the position of that content on display 14. If desired, burn-in risk can be determined by evaluating frames of content for the presence of persistently bright areas. Consider, as an example, the illustrative image frames (F1 . . . FI . . . FN) of FIG. 11. These frames may include bright objects. Some bright objects may be transient. For example, the square and circular bright objects of frame F1 are not present in later frames such as frames FI and FN. Because these objects only appear briefly on the pixel array of display 14, the process of displaying these objects does not pose a burn-in risk for display 14. On the other hand, triangular object 82 persists in the same location on display 14 for all frames F1 . . . FI . . . FN (e.g., for more than 0.1-100 s, more than 10 s, for an amount that is less than 1000 s, or other suitable lengthy time that is associated with potential display pixel burn-in effects). As a result, there may be a burn-in risk if object 82 is displayed at elevated luminance levels. Burn-in risk may be determined by maintaining running averages of luminance (e.g., average pixel luminance values) for subareas of display 14 (e.g., rectangular blocks containing one or more pixels 36 or other suitable subregions of pixel array 28). Burn-in risk can be computed on a pixel-by-pixel basis by maintaining a running average of each pixel's luminance or may be computed on larger blocks (e.g., blocks containing 10-100 pixels, 10-1000 pixels, 100-1000 pixels, at least 100 pixels, fewer than 10,000 pixels, or other suitable number of pixels). Other content statistics 60 may also be gathered (e.g., quality information, etc.). The use of average pixel luminance for frames of image data and block-by-block average pixel luminance information to evaluate the brightness of content being displayed on display 14 and to evaluate whether there is a burn-in risk associated with persistent bright content is merely illustrative.

Engine 24 may use information such as average pixel luminance information and burn-in risk information in dynamically adjusting content mapping to display mapping curves for display 14 (e.g., by dynamically adjusting tone mapping parameters such as SW, RW, and/or BL).

Figure 12:
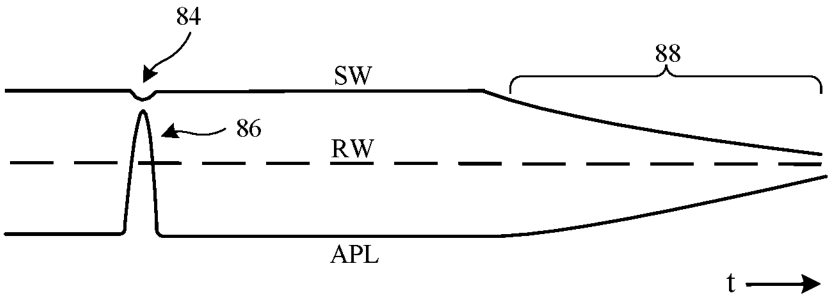
FIG. 12 is a graph showing how momentary bright content may not strongly affect a specular white level and showing how persistent bright content may result in significant changes to the specular white level in accordance with an embodiment.

Consider, as an example, the scenario of FIG. 12. In this example, engine 24 is maintaining information on the average pixel luminance (APL) for the content that is being displayed on display 14 as a function of time. As indicated by peak 86, there may be a momentary period of bright content that results in a spike in average pixel luminance APL. Because this type of momentary brightness level is typically associated with the presentation of specular highlights in a movie or other desirable momentary high-luminance content, engine 24 may maintain headroom at a constant or nearly constant level, as indicated by the relatively small dip 84 in specular white level SW and the constant value of reference white level RW at times t overlapping peak 86. On the other hand, persistently high average pixel luminance values for many frames of content may overly stress display 14 and/or may consume more power than desired and increase the thermal envelope more than desired and lead to an unsatisfactory user experience. Accordingly, as indicated during time period 88 of FIG. 12 in which measured APL is rising persistently, engine 24 may slowly lower headroom (e.g., SW may be lowered to RW or other suitable level so that SW/RW decreases) in response to persistent periods of elevated APL values.

Figure 13:
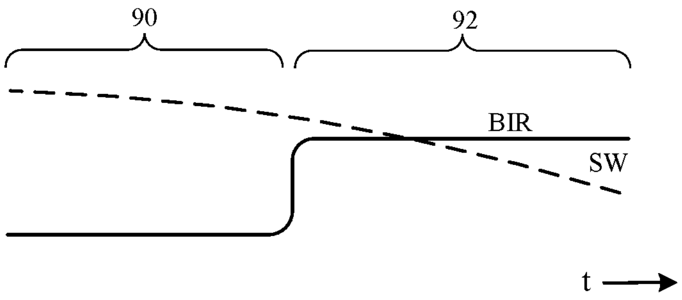
FIG. 13 is a graph showing how a specular white level may be reduced in response to detection of an elevated burn-in risk in accordance with an embodiment.

An example of the response of engine 24 to detection of elevated burn-in risk BIR is shown in FIG. 13. In the example of FIG. 13, display 14 has been divided into multiple burn-in-risk blocks each of which includes one or more pixels and each of which is separately analyzed by engine 24 (implemented on control circuitry 12 and/or implemented using hardware such as display driver circuitry 26) to determine a corresponding burn-in-risk value (BIR). As engine 24 analyzes frames of content being displayed on display 14 and determines these BIR values, one or more blocks may exhibit a BIR value that increases as shown by the BIR curve of FIG. 13. During time period 90, BIR is low, because there is no burn-in risk, but during time period 92, BIR rises, because high-luminance content is being persistently presented in the burn-in-risk block associated with the example of FIG. 13. In response, engine 24 can reduce headroom to prevent burn-in damage to pixels 36 in the block of pixels 36 corresponding to the elevated BIR value.

For example, the value of RW may be held constant and the value of SW can be decreased smoothly in response to the increase in BIR, as illustrated by curve SW in FIG. 13. The reduction of SW in response to the increase in BIR that is illustrated in FIG. 13 can take place over any suitable time period (e.g., a period of 1-10 min, at least 30 sec, at least 2 min, less than 15 min, or other suitable period of time). The use of an appropriate transition time for reducing SW in response to detected increases in BIR and/or the use of an appropriate transition time for reducing SW in response to elevation in average pixel luminance APL of FIG. 12) may help reduce visible artifacts on display 14.

If desired, engine 24 may make tone mapping adjustments based on the characteristics of display 14. These display characteristics may serve as constrains on the optimization decisions made by engine 24. Examples of display characteristics that may be taken into account by engine 24 in determining appropriate values for the tone mapping parameters (e.g., to adjust the tone mapping curve applied to the content being displayed) include the contrast ratio of display 14, the bit depth of display 14, and the maximum specular white luminance level achievable by display 14. If the contrast ratio of display 14 is low, engine 24 may, as an example, impose an upper limit on SW to ensure that displayed content is visually appealing. If the bit depth supported by display 14 is higher (e.g., more than 9 bits), high dynamic range content may be displayed with a large headroom value. If the bit depth supported by display 14 is lower (e.g., if display 14 supports a bit depth of 9 bits), headroom may be lowered (e.g., headroom may be lowered to a headroom amount that is suitable for 9 bit displays). More headroom may also be provided when display 14 is operating on AC power from power source 18 rather than DC power. If desired, engine 24 may also adjust tone mapping parameters based on other criteria (e.g., information on the color gamut supported by display 14, information on power constraints for display 14, information on the sensitivity of display 14 to burn-in effects, etc.). Display characteristics information for engine 24 may be supplied to engine 24 manually, may be supplied to engine 24 via unidirectional and/or bidirectional communications between control circuitry 12 and display 14 (e.g., when display 14 is coupled to control circuitry 12 with a cable or wirelessly), and/or may be stored in control circuitry 12 during manufacturing (e.g., based on known circuit characteristics, default pixel attributes, and/or pixel performance metrics and/or other display characteristics that are measured with test equipment during manufacturing). If desired, control circuitry 12 may retrieve information on display characteristics from a database containing display characteristics for various models and manufacturers of displays and/or containing default display characteristics to be used when control circuitry 12 does not identify the specific model of display 14 that is coupled to control circuitry 12.

Figure 14:
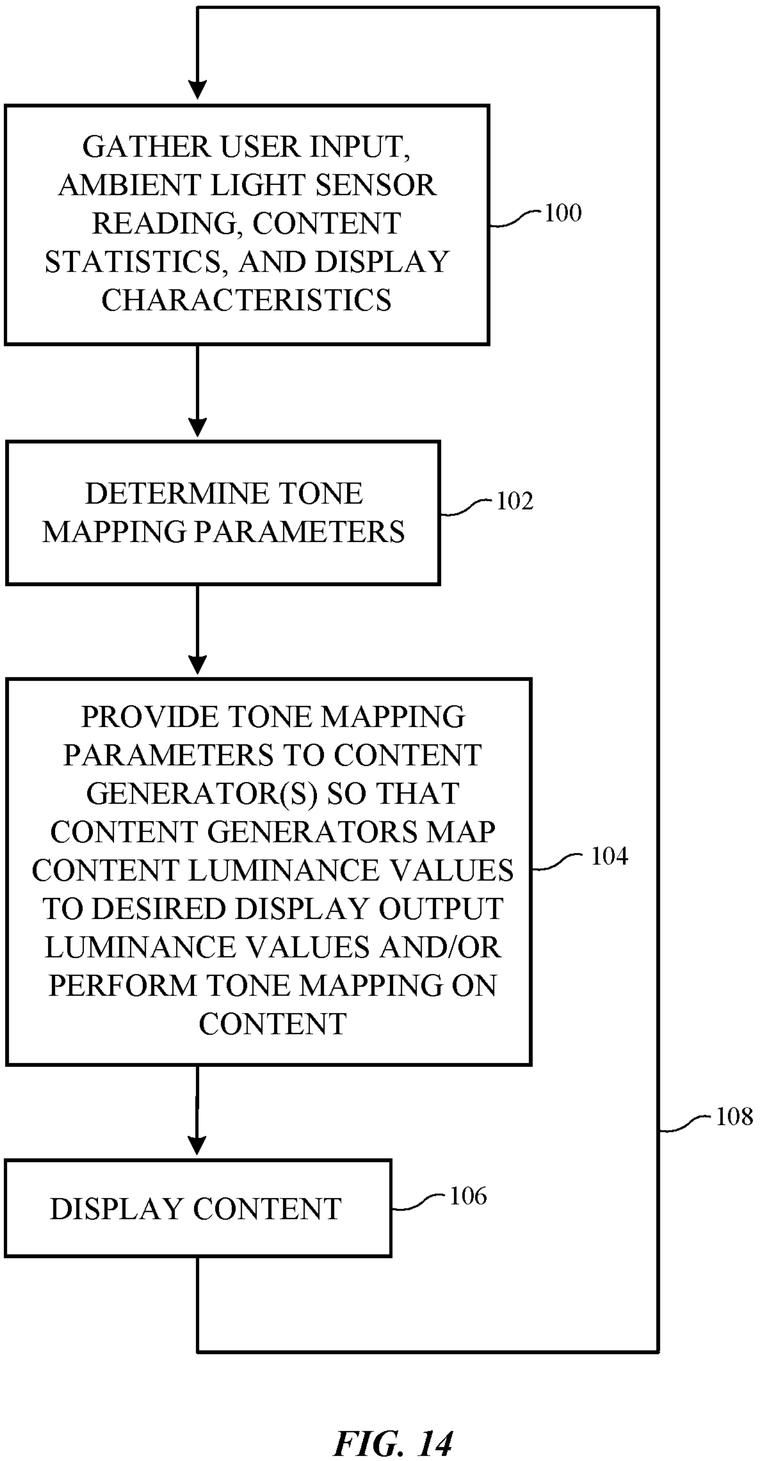
FIG. 14 is a flow chart of illustrative operations involved in using an electronic device with a display in accordance with an embodiment.

FIG. 14 is a flow chart of illustrative operations involved in operating device 10.

During the operations of block 100, control circuitry 12 (e.g., tone mapping engine 24 and/or other code running on device 10) may use input-output circuitry 16 to gather brightness settings information 58 and/or other user input (e.g., from a touch sensor, button, and/or other input-output device 30), to gather information on ambient conditions 56 such as ambient light sensor readings (e.g., ambient light level information and/or ambient color information from ambient light sensor 32) and to gather temperature measurements (e.g., from temperature sensor 34). Control circuitry 12 may gather display characteristics 62 (e.g., from display 14, from a user, from a database, etc.) and may analyze content from content generator(s) 64 such as content generators 20 and/or 22 to produce content statistics 60. Content statistics 60 may include information on content quality, burn-in risk, average pixel luminance for frames of content, and other content statistics.

During the operations of block 102, tone mapping engine 24 may select a tone mapping curve (e.g., a content-luminance-to-display-luminance mapping such as one of the illustrative mappings of FIG. 4) to be applied to the content of content generators 64 based on the information gathered during block 100. Tone mapping parameters (e.g., SW, RW, BL, and/or other tone mapping parameters) corresponding to the selected tone mapping curve may also be generated.

During the operations of block 104, the selected tone mapping parameters may be supplied to content generators 64 for use by content generators 64 (e.g., so that content generators 64 supply content to display 14 that is compliant with the selected tone mapping curve) and/or engine 24 may use the selected tone mapping curve to remap content to appropriate luminance values. The strength of color adjustments (e.g., color cast corrections of the type described in connection with FIGS. 7 and 8) may be adjusted by engine 24 and/or by content generators 64 in accordance with the headroom associated with the content. Device 10 may be placed in a low power mode when the measured temperature of display 14 is high, when battery charge is low, when a user selects the low power mode, and/or based on other display power constraints.

As indicated by block 106, content with luminance values adjusted by engine 24 and/or content generators 64 in accordance with the selected tone mapping parameters may be displayed on display 14. As indicated by line 108, the operations of FIG. 14 may be performed continually during the operation of display 14 and device 10.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
- input-output circuitry including an ambient light sensor and at least one input-output device;
- a display having an array of pixels; and
- control circuitry configured to:
  - gather an ambient light reading with the ambient light sensor;
  - gather a brightness setting with the input-output device;
  - analyze content to produce content statistics;
  - generate tone mapping parameters based at least partly on the ambient light reading, the brightness setting, and the content statistics; and
  - display the content on the display in accordance with the tone mapping parameters.

2. The electronic device defined in claim 1 wherein the tone mapping parameters include a black level, reference white level, and specular white level.

3. The electronic device defined in claim 2 wherein the control circuitry is configured to generate the tone mapping parameters at least partly based on display power constraints.

4. The electronic device defined in claim 2 wherein the control circuitry is configured to generate the tone mapping parameters at least partly based on a display characteristic associated with the display.

5. The electronic device defined in claim 4 wherein the display characteristic comprises a display characteristic selected from the group consisting of: a contrast ratio for the display, a bit depth for the display, and a maximum specular white level produced by pixels in the display.

6. The electronic device defined in claim 2 further comprising a temperature sensor configured to measure a temperature of the display, wherein the control circuitry is configured to generate the tone mapping parameters based at least partly on the temperature.

7. The electronic device defined in claim 2 wherein the control circuitry is configured to reduce the specular white level when operating the display in a low power mode.

8. The electronic device defined in claim 2 wherein a headroom value is associated with a range between the specular white level and the reference white level and wherein the control circuitry is configured to reduce a color compensation strength associated with displaying content with the display based at least partly on the headroom value.

9. The electronic device defined in claim 8 wherein the specular white level and the reference white level comprise respectively a specular white level in cd/m2 and a reference white level in cd/m2.

10. The electronic device defined in claim 2 wherein the content statistics include an average pixel luminance level associated with frames of the content and wherein the control circuitry is configured to generate the tone mapping parameters based at least partly on the average pixel luminance level.

11. The electronic device defined in claim 2 wherein the content statistics include at least one burn-in-risk value associated with an area of content on the display and wherein the control circuitry is configured to generate the tone mapping parameters based at least partly on the burn-in-risk value.

12. The electronic device defined in claim 2 wherein the content statistics include content quality information for the content and wherein the control circuitry is configured to generate the tone mapping parameters based at least partly on the content quality information.

13. The electronic device defined in claim 12 wherein the content quality information comprises information selected from the group consisting of: content bit depth, metadata indicative of quality, content frame rate, content compression type, content compression amount, content noise level, content data rate, and content color gamut.

14. The electronic device defined in claim 2 wherein the control circuitry is configured to display the content on the display in a low power mode in which the specular white level is reduced relative to a specular white level used during a normal power mode and wherein the control circuitry is configured to enter the low power mode in response to a condition selected from the group consisting of: a user input selecting the low power mode, a low battery charge state for a battery in the electronic device, and an elevated temperature for the display.

15. An electronic device, comprising:
an ambient light sensor;
an input-output device;
a display; and
control circuitry configured to:
gather an ambient light reading with the ambient light sensor;
gather a user-selected brightness setting with the input-output device;
analyze content to produce content statistics;
select a black level, reference white level, and specular white level associated with a content-luminance-to-display-luminance mapping based at least partly on the ambient light reading, the user-selected brightness setting, and the content statistics; and
display the content on the display in accordance with the content-luminance-to-display-luminance mapping.

16. The electronic device defined in claim 15 wherein the control circuitry is configured to adjust at least one of: the black level, the reference white level, and the specular white level based at least partly on a display characteristic associated with the display.

17. The electronic device defined in claim 16 wherein the display characteristic comprises a display characteristic selected from the group consisting of: a contrast ratio for the display, a bit depth for the display, and a maximum specular white level produced by pixels in the display.

18. The electronic device defined in claim 17 wherein the content statistics include multiple burn-in risk values corresponding to different respective blocks of pixels in the display.

19. An electronic device, comprising:
an ambient light sensor;
an input-output device;
a display; and
control circuitry configured to:
gather an ambient light reading with the ambient light sensor;
gather a brightness setting with the input-output device;
analyze content to produce content statistics including an average pixel luminance value averaged across multiple frames of the content;
select a black level, reference white level, and specular white level associated with a content-luminance-to-display-luminance mapping curve based at least partly on the ambient light reading, the brightness setting, and the content statistics; and
display the content on the display in accordance with the content-luminance-to-display-luminance mapping curve.

20. The electronic device defined in claim 19 wherein the content statistics include quality information on the content, wherein the quality information comprises information selected from the group consisting of: content bit depth, metadata indicative of quality, content frame rate, content compression type, content compression amount, content noise level, content data rate, and content color gamut.

* * * * *